(12) United States Patent
Yin et al.

(10) Patent No.: US 10,490,384 B2
(45) Date of Patent: Nov. 26, 2019

(54) EXTENDED INTERACTION DEVICE COMPRISING A CORE AND SHELL DEVICE BODY FOR SUPPORTING RING-SHAPED RESONANT CAVITIES, ELECTRON BEAM TUNNELS AND A COUPLING GROOVE THEREIN AND AN OUTPUT WAVEGUIDE AT A MIDDLE PORTION OF THE SHELL

(71) Applicant: UNIVERSITY OF ELECTRONIC SCIENCE AND TECHNOLOGY OF CHINA, Chengdu (CN)

(72) Inventors: Yong Yin, Chengdu (CN); Lin Meng, Chengdu (CN); Bin Wang, Chengdu (CN); Hailong Li, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 29 days.

(21) Appl. No.: 15/793,970

(22) Filed: Oct. 25, 2017

(65) Prior Publication Data

US 2018/0301311 A1  Oct. 18, 2018

(30) Foreign Application Priority Data

Apr. 18, 2017  (CN) .......................... 2017 1 0251057

(51) Int. Cl.
*H01J 25/11* (2006.01)
*H01J 23/20* (2006.01)
*H01Q 9/04* (2006.01)
*G02B 6/12* (2006.01)
*G02F 1/035* (2006.01)
*H01P 5/107* (2006.01)
*H01J 23/36* (2006.01)

(52) U.S. Cl.
CPC .......... *H01J 25/11* (2013.01); *G02B 6/12016* (2013.01); *G02F 1/0356* (2013.01); *H01J 23/20* (2013.01); *H01J 23/36* (2013.01); *H01P 5/107* (2013.01); *H01Q 9/0421* (2013.01)

(58) Field of Classification Search
CPC .. H01J 25/02; H01J 25/04; H01J 25/11; H01J 25/14; H01J 23/07; H01J 23/16; H01J 23/20
USPC ................................................ 315/5.14, 5.16
See application file for complete search history.

(56) References Cited

U.S. PATENT DOCUMENTS

| 2,408,409 | A | * | 10/1946 | Bowen | ..................... | H01J 25/06 |
| | | | | | | 307/107 |
| 4,733,131 | A | * | 3/1988 | Tran et al. | ............... | H01J 25/10 |
| | | | | | | 315/4 |
| 5,239,235 | A | * | 8/1993 | Mourier | ................ | H01J 23/027 |
| | | | | | | 315/5.14 |

\* cited by examiner

*Primary Examiner* — Benny T Lee
(74) *Attorney, Agent, or Firm* — Matthias Scholl P.C.; Matthias Scholl

(57) ABSTRACT

A millimeter-wave extended interaction device, including: a device body; resonant cavities; electron beam tunnels; an output waveguide; and a coupling hole. The device body includes a shell and a core, and an annular coupling channel is disposed between the shell and the core. The resonant cavities are a set of ring-shaped cavities with a radial height of $2/5\lambda$, to $3/5\lambda$, parallel and equally spaced around an axis of the core. The electron beam tunnels are arranged at equal radian intervals and parallel to the axis of the core. The output waveguide is disposed in the middle of the shell and communicates with the annular coupling channel through a coupling hole. The core and the inner surface of the shell are sealed and fixed, and the output waveguide and the shell are sealed and fixed.

5 Claims, 4 Drawing Sheets

EXTENDED INTERACTION DEVICE COMPRISING A CORE AND SHELL DEVICE BODY FOR SUPPORTING RING-SHAPED RESONANT CAVITIES, ELECTRON BEAM TUNNELS AND A COUPLING GROOVE THEREIN AND AN OUTPUT WAVEGUIDE AT A MIDDLE PORTION OF THE SHELL

CROSS-REFERENCE TO RELATED APPLICATIONS

Pursuant to 35 U.S.C. § 119 and the Paris Convention Treaty, this application claims foreign priority to Chinese Patent Application No. 201710251057.2 filed Apr. 18, 2017, the contents of which and any intervening amendments thereto are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, and Cambridge, Mass. 02142.

BACKGROUND OF THE INVENTION

Field of the Invention

This present disclosure relates to extended interaction devices (EIDs), and more particularly to a millimeter-wave EID comprising coaxial resonant cavities and multiple electron beams.

Description of background art

The output power of millimeter-wave sources based on vacuum electronic technology is mainly limited by two aspects: 1 ) The structure size of devices operated in a fundamental mode is becoming ever smaller with increasing operating frequency, which limits the improvement of the available electron beam current in millimeter-wave devices and lowers output power. 2 ) Operating the device in a fundamental mode at high frequency requires reducing the size of the resonant cavity (the size of the resonant cavity is inversely proportional to the frequency). This inevitably increases the processing difficulty and production cost of the device.

Adopting a larger size device should allow for a high-order mode. However, a high-order mode operation would suffer from mode competition and coupling impedance limits, dramatically lowering the operation stability and efficiency of the device or even causing the device to fail.

There are three main methods used to improve output power of millimeter-wave sources based on vacuum electronic technology. The first one is to adopt multiple electron beams to reduce the operating voltage of the device. The transverse space for placing multiple beams is limited because the interaction structure is a traditional reentrant resonant cavity, which restricts the maximum number of available multiple beams or the total area in the transverse direction of all beams. The second method exploits sheet electron beam. The total operating current can be increased to improve output power by distributing sheet beam in a transverse direction. However, the enlargement of the transverse space is limited and extending further the space would introduce mode competition. As the third method, a ring strip electron beam can be employed to obtain higher output power by increasing electron emission area and electron beam tunnel area. There are practical limits to this method because a high-quality ring strip electron beam is difficult to achieve.

SUMMARY OF THE INVENTION

In view of the above-described problems, it is one objective of the invention to provide a millimeter-wave EID comprising coaxial cavities and multiple electron beams. Improvements are achieved to the output power and operation stability of the device operated in fundamental mode with simplifying structure and processing of millimeter-wave EID and lowering processing cost. Additionally, an increasing service life of the device is realized.

In an embodiment of the invention, the structure of millimeter-wave EID is constructed as a cylindrical body with core and shell. A ring-shaped groove is machined on the surface of the cylinder between two ends of the core. A groove accompanied with the inner surface of the shell can form an annular coupling channel of the EID. A group of ring-shaped cavities is parallel to each other, equally spaced around an axis of the core in the bottom of the ring-shaped groove (annular coupling channel). The outer ring opening of each ring-shaped resonant cavity is connected by the annular coupling channel. Meanwhile, on a central line of each ring-shaped resonant cavity a number of electron beam tunnels are arranged at equal radian intervals, which are parallel to the axial line of the core and each communicating with each ring-shaped resonant cavity and passing through two end walls of the core. An output waveguide is set in the center of the shell. A coupling hole is designed to locate between the bottom of the output waveguide and the inner surface of the shell, thus being connected with the annular coupling channel assembled. The whole core is placed in the shell, sealed and fixed with the inner wall of the shell, then forming the millimeter-wave EID described in this invention. Therefore, the millimeter-wave EID comprising coaxial resonant cavities and multiple electron beams presented in this invention, comprises the device body, resonant cavities and electron beam tunnels, an output waveguide and a coupling hole. The key is that the device body comprises a shell and a core. Between the shell and the core sets an annular coupling channel. A plurality of ring-shaped cavities with radial height of $2\lambda/5$ to $3\lambda/5$ ($\lambda$ is the operating wavelength), which are parallel to each other and equally spaced around the axis of the core, are employed. A number of electron beam tunnels distributed at equal radian intervals and parallel to the axial line of the core are connected with each ring-shaped resonant cavity and pass through two end faces of the core. The output waveguide is mounted in the middle of the shell and communicates with the annular coupling channel through the coupling hole. Some parts are sealed and fixed, i.e. the core and the inner surface of the shell, the output waveguide and the shell.

The annular coupling channel described, the radial height of which is in the range of $\lambda/10$ to $\lambda/5$, has the same axial width with the distance between the outer walls of the resonant cavity at the front and rear ends. A group of ring-shaped resonant cavities have the radial height of $2/5\lambda$ to $3/5\lambda$ and the number of cavities is in the range of 5 to 19. The width along the axial direction of the core is determined by operating voltage. The width is in the range of 0.15 to 5 mm when the operating voltage is between 5 to 40 kV. The described electron beam tunnels, the number of which is in the range of 5 to 20, pass through two end faces of the core. The diameter of beam tunnels is from $\lambda/7$ to $\lambda/5$ and the space between two adjacent beam tunnels is approximate 1 to 3 times the corresponding beam tunnel. The coupling hole is shaped to be rectangular or circular.

This invention employs the combination of the core and the shell to construct the EID comprising 5 to 19 ring-shaped resonant cavities, which are parallel to each other and equally spaced around the axis of the core. This invention can reduce greatly the length of the device, improve effectively the device impedance and favor to the use of permanent magnet for focusing. Moreover, the inner and outer circumstances of the ring-shaped resonant cavity are far larger than the operating wavelength. This permits more electron beam tunnels for increasing efficiently the power capacity and output power of the device. This invention can ensure the device operating in a fundamental mode stably for a long time by controlling the radial dimension of each ring-shaped resonant cavity in the range of 2/5λ to 3/5λ. Therefore, the millimeter-wave EID presented in this invention has the ability of increasing effectively the output power and operation stability of the device operated in a fundamental mode. The invention also has the advantages of simplifying the structure of the device, relaxing the processing, reducing the processing cost, allowing a long service life, and so on. At the entrance of the electron beam tunnel connects directly the output end of the electron optical system used to produce multiple electron beams. This enables the interaction between the electron beam and the high frequency field after electrons entering into the device. The outlet terminal can be connected with a collector with a depressed collector. Compared to the conventional millimeter-wave EID, the invention can use a larger resonant cavity for operating in a fundamental mode. This can thereby increase the number of the electron beam used, improve the power capacity of the EID and output power of an "O" type vacuum electronic device, then overcoming the output power limits of millimeter-wave sources based on the "O" type vacuum electronic device. Particularly, the assembling accuracy can be effectively guaranteed due to the simple structure, fewer components, good integrality, easy processing for this invention.

Figure 1:
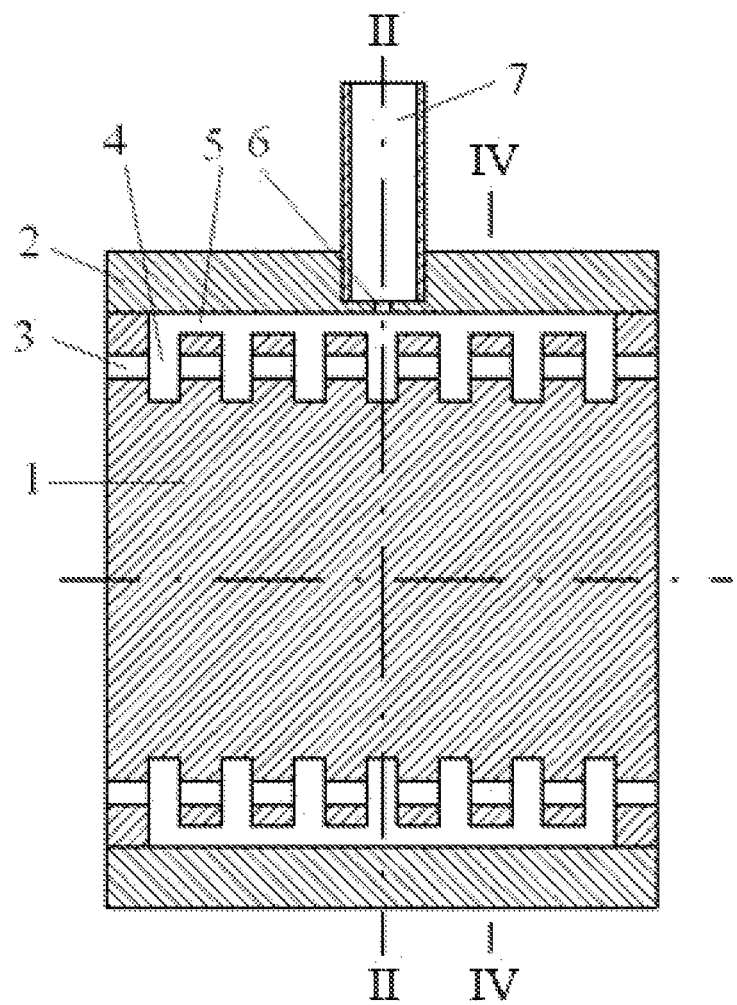
FIG. 1 is a schematic drawing of a millimeter-wave extended interaction device according to one embodiment of the invention.

In the drawings, the following reference numbers are used: 1: Core, 2: Shell, 3: Electron beam tunnel, 4: Ring-shaped resonant cavity, 5: Annular coupling channel, 6: Coupling hole, 7: Output waveguide.

DETAILED DESCRIPTION OF THE EMBODIMENTS

The implementation method takes a 94 GHz (the corresponding operating wavelength λ is about 3.2 mm) EID operated in fundamental mode ($TM_{010}$ mode) at the operating voltage of 20 kV for example.

Figure 2:
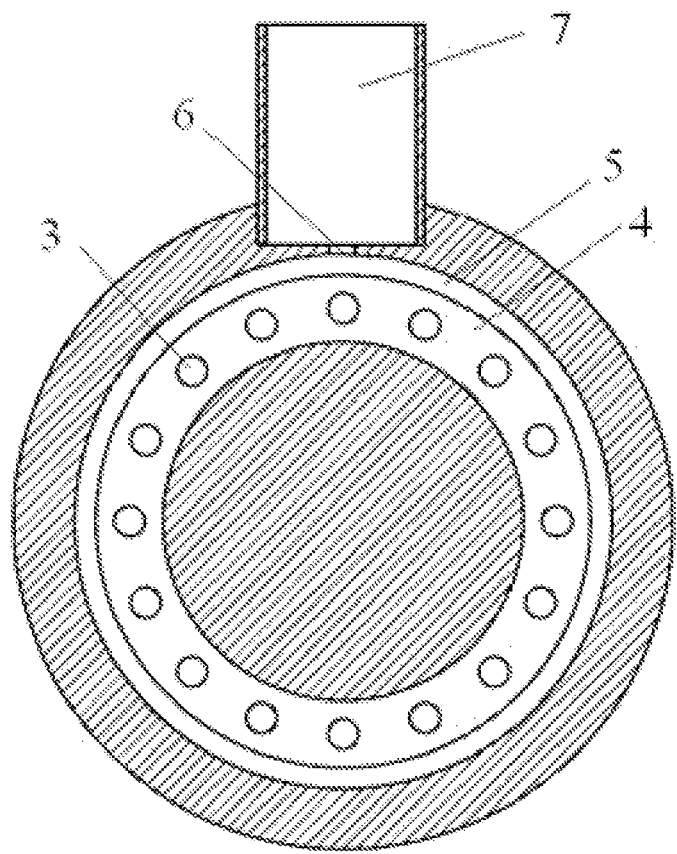
FIG. 2 is a cutaway view taken from line II-II in FIG. 1.
Figure 3:
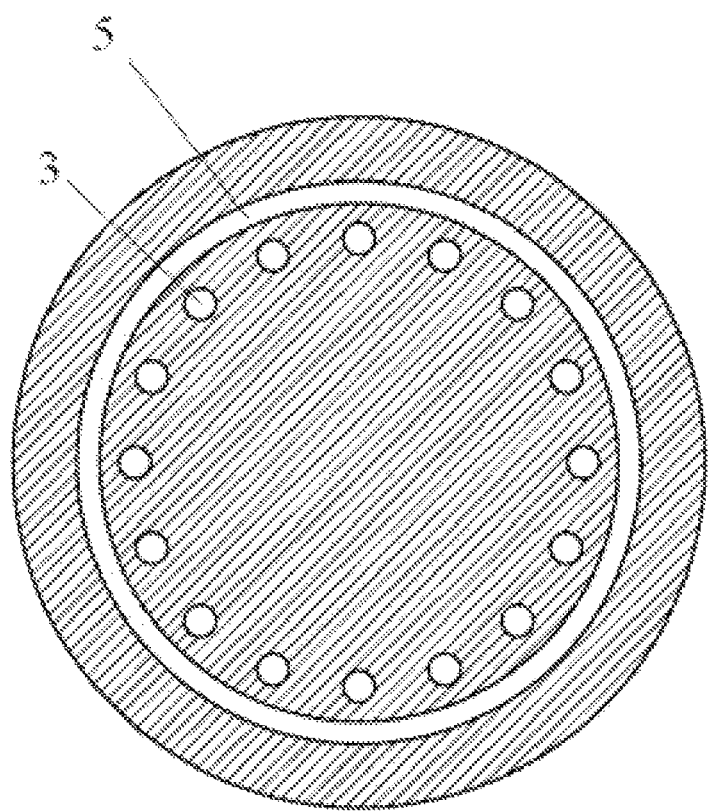
FIG. 3 is a cutaway view taken from line IV-IV in FIG. 1.
Figure 4:
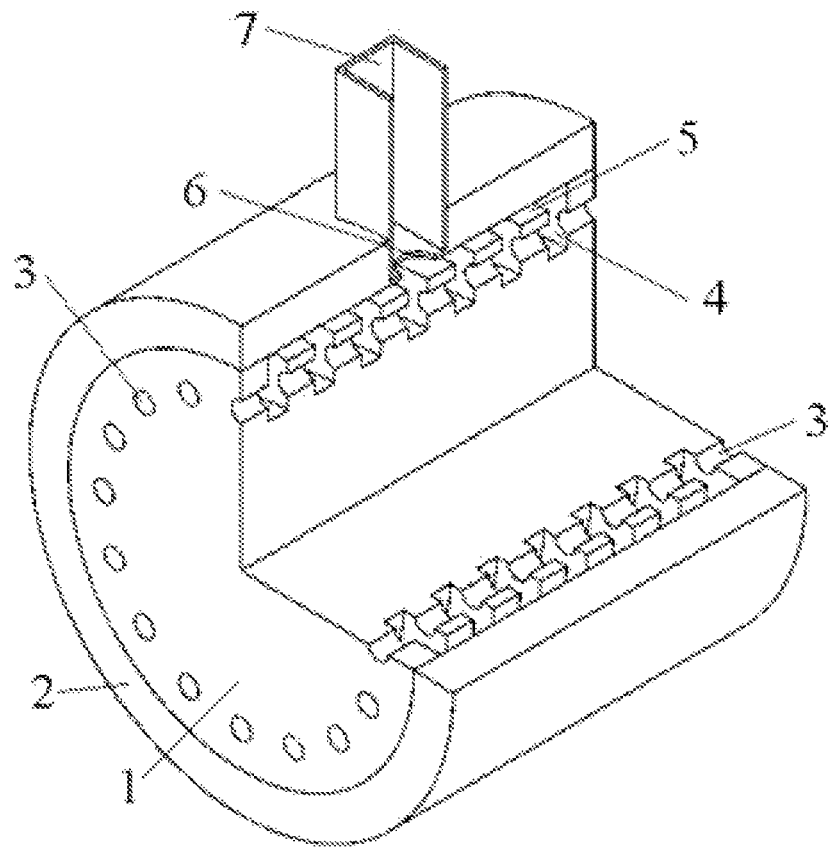
FIG. 4 is a part cutaway view of a millimeter-wave extended interaction device according to one embodiment of the invention.

As shown in FIGS. 1-4, the nominal diameter and the axial length of the core 1 (FIGS. 1 and 4) are 8.7 mm and 8.0 mm respectively. The nominal size of the shell 2 is as follows: the diameter of 8.7 mm, the outer diameter of 12 mm, and the axial length of 8.0 mm. The material is oxygen free copper. This method sets 7 ring-shaped resonant cavities 4 (FIGS. 1, 2, and 4) in the core 1. The inner and outer radius of each ring-shaped resonant cavity is 2.4 mm and 4.0 mm (the radial height of the resonant cavity is λ/2) respectively. The axial width of each ring-shaped resonant cavity is 0.40 mm and the space between two adjacent resonant cavities is 0.52 mm. The axial length of the annular coupling channel 5 is 5.92 mm and its inner, outer radius is 4.0 mm, 4.35 mm respectively. Namely, the radial gap of the annular coupling channel is 0.35 mm. In the central lines of the ring-shaped resonant cavities 4 place 16 electron beam tunnels with the diameter of 0.5 mm which are arranged at equal radian intervals and pass through the core 1. The shell 2 is provided with the output waveguide 7 (FIGS. 1, 2, and 4) and the coupling hole 6 (FIGS. 1, 2, and 4), and the distance between the central lines of which and the core 1 is 4.0 mm. Among, the output waveguide 7 is a standard W-band rectangular waveguide and the coupling hole 6 is a circular hole with the diameter of 0.85 mm.

This method was implemented by simulation tests. The operating frequency is 94 GHz when the device operates in fundamental mode at 20 kV. The total beam current of 16 electron beam tunnels obtains 16 A, each beam tunnel 3 having current of 1.0 A.

The input beam power of the device is 320 kW and the output microwave power over 16.5 kW can be achieved. The output efficiency is about 5.15%.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A millimeter-wave extended interaction device, comprising:
    a device body comprising a shell and a core; the core comprising resonant cavities, a coupling groove, and electron beam tunnels; and the shell comprising a coupling hole; and
    an output waveguide;
    wherein:
    the shell and the core are in a cylindrical shape, and are coaxially disposed around a longitudinal axis;
    the core is disposed within the shell;
    the coupling groove is in a cylindrical shape, and is recessed inward from an outer surface of the core;
    the resonant cavities are a set of ring-shaped cavities with a radial height of 2/5λ, to 3/5λ, are coaxially disposed around the longitudinal axis, and are parallel to each other and equally spaced from each other; wherein λ, represents an operating wavelength;
    the resonant cavities are connected to the coupling groove;
    the electron beam tunnels are arranged at equal radian intervals and parallel to the longitudinal axis, and each electron beam tunnel is connected to the resonant cavities and extends between two end walls of the core;
    the coupling hole extends outward from an inner surface of the shell;
    the coupling hole is connected to the coupling groove;
    the output waveguide is disposed at a middle portion of the shell between two ends of the shell, and is connected to the coupling hole;
    the resonant cavities are coupled to the output waveguide via the coupling groove and the coupling hole; and
    the core and the shell are sealed and fixed to each other, and the output waveguide and the shell are sealed and fixed to each other.

2. The device of claim 1, wherein a radial height of the coupling groove is in the range from λ/10 to λ/5, and an axial width thereof is equal to a distance between outer walls of the two resonant cavities that are respectively adjacent to the two end walls of the core.

3. The device of claim 1, wherein the resonant cavities are 5 to 19 in number, and a respective width of the resonant cavities along an axial direction parallel to the longitudinal axis is related to an operating voltage; when the operating voltage is 5-40 kV, the respective width of the resonant cavities is 0.15-5 mm.

4. The device of claim 1, wherein the electron beam tunnels are 5-20 in number and a respective diameter of each electron beam tunnel along a plane that is perpendicular to the longitudinal axis is $\lambda/7$ to $\lambda/5$; a space between two adjacent electron beam tunnels is 1-3 times a diameter of a respective electron beam tunnel.

5. The device of claim 1, wherein the coupling hole is rectangular or circular.

\* \* \* \* \*